United States Patent Office 3,252,865
Patented May 24, 1966

3,252,865
STABILIZED FAT-SOLUBLE VITAMIN
COMPOSITIONS
Heinrich Kläui, Riehen, Switzerland, assignor to Hoffmann-La Roche Inc., Nutley, N.J., a corporation of New Jersey
No Drawing. Filed Nov. 29, 1963, Ser. No. 327,098
Claims priority, application Switzerland, Dec. 7, 1962, 14,388/62
11 Claims. (Cl. 167—81)

This invention relates, in general, to novel vitamin compositions. More particularly, the invention relates to stable fat-soluble vitamin-containing compositions, to the production of such compositions and to the use thereof in the fortification of foods and feeds.

It is well known that certain fat-soluble vitamins, especially vitamin A, are extremely sensitive compounds. For example, vitamin A alcohol and the conventional esters of vitamin A alcohol, such as vitamin A acetate, vitamin A palmitate, etc., are sensitive to the oxidizing influences of the atmosphere and, as a result, these compounds undergo decomposition when they are allowed to stand, even for relatively short periods of time, under normal atmospheric conditions. Recognizing this, the art has proposed numerous procedures and techniques for stabilizing vitamin A compounds. Thus, for example, it has been suggested that vitamin A compounds are stabilized by mixing same with suitable antioxidant material. While, for the most part, antioxidants have proved to be helpful, the results which have been obtained simply by the use of antioxidants leave much to be desired.

It has been suggested also that the decomposition of vitamin A compounds could be obviated, or at least minimized, by incorporating such compounds into some suitable protective medium. One of the earliest prior art proposals involved the adsorption of vitamin A on a suitable inert carrier, such as, oatmeal. It was found, however, that the vitamin component of such an adsorbate was stabilized, but only to a relatively slight degree. In a further attempt to protect vitamin A alcohol and its esters from decomposition, it was proposed to embody these sensitive compounds into an oil or fat in order to form a solution thereof. The stability of the vitamins in such solutions did not, however, prove to be entirely satisfactory.

At the present time a major portion of the commercially available vitamin A products are provided in the form of colloidal dispersions. In the production of these dispersions, it is the usual practice to prepare first an emulsion of vitamin A in an aqueous colloid, for example, in gelatin or gum arabic, and subsequently, to work up this emulsion into discrete finely divided particles, each of which contains the vitamin in coated form. While such products are generally satisfactory insofar as the stability of the vitamin component is concerned, the products are relatively expensive to produce.

It has now been discovered that vitamin preparations having outstanding stability can be obtained simply by mixing a fat-soluble vitamin material with a mixture comprising an antioxidant and a liquid or solid primary lower alkanolamine as a synergist.

In the practice of this invention there can be used, in general, any fat-soluble vitamin-containing material. Thus, for example, the present compositions can contain vitamin A, vitamin D, vitamin E, or vitamin K or mixtures thereof. Additionally, the compositions of this invention can contain, as the material to be stabilized, carotenoids. Included among the carotenoid compounds which can be employed herein as β-carotene; β-apo-8'-carotenal; β-apo-8'-carotinic acid ester, such as the ethyl ester; canthaxanthin; zeaxanthin; lycopene; etc. As used herein, the expression "fat-soluble vitamin materials" is intended to include generically the fat-soluble vitamins A, D, E, and K as well as the carotenoid compounds.

As the antioxidant component of the present compositions one can use, for example, 6-ethoxy-2,2,4-trimethyl-1,2-dihydroquinoline, butylated hydroxy toluene, butylated hydroxy anisole, 4,4'-bis-(2,6-ditertiary-butylphenol) γ-tocopherol or an ester of gallic acid. The use of mixtures of such antioxidants is included within the scope of this invention. In general, any ester of gallic acid with an alcohol, particularly an aliphatic monohydroxy alcohol, having at least about 3 carbon atoms can be used in the practice of this invention. Such esters include, for example, propyl gallate, octyl gallate, decyl gallate, dodecyl gallate, etc. In the preferred practice of the invention, however, 6-ethoxy-2,2,4-trimethyl-1,2-dihydroquinoline is used since this compound has been found to have outstanding antioxidizing properties. However, compositions having completely satisfactory stability characteristics are obtained in the practice of this invention even when an antioxidant which is less effective than 6-ethoxy-2,2,4-trimethyl-1,2-dihydroquinoline is employed. Thus, for example, in carrying out this invention it may be desired, for one reason or another, to employ a naturally occurring substance such as γ-tocopherol as the antioxidant. While, in and of itself, γ-tocopherol is less effective as an antioxidant than 6-ethoxy-2,2,4-trimethyl-1,2-dihydroquinoline, it has been observed that a high degree of stabilization is achieved when γ-tocopherol is used in admixture with the synergistic material hereinafter described.

The synergists which are used in the practice of this invention are characterized broadly as primary lower alkanolamines, which at normal room temperatures, are in a liquid or solid state. Also, salts of such alkanolamines with higher fatty acids are suitable for use as the synergist. Thus, for example, ethanolamine, propanolamine and salts of such amino alcohols with higher fatty acids are well suited for use as synergists in carrying out this invention. Additionally, mixtures of such amino alcohols, mixtures of salts of such amino alcohols and mixtures of the alcohols themselves with the alkanolamine salts can be used. In the preferred practice of the invention, however, ethanolamine is used as the synergist.

The quantity of antioxidant which is used in carrying out this invention can be varied within rather wide ranges. In general, the compositions of this invention will contain the antioxidant in a quantity which is at least about 0.1% of the weight of the material to be stabilized. Ordinarily, however, the amount of antioxidant which is used will not exceed about 50% of the weight of the material to be stabilized.

The quantity of synergist which is used in the practice of this invention is also variable within rather wide ranges. As a general rule, however, the products of this invention will contain the synergist in a quantity which is at least about 0.1% of the weight of the material to be stabilized. However, substantially greater quantities of synergist can be employed if desired. For example, it has been found to be convenient to use a quantity of synergist which is at least equal to the quantity of antioxidant employed. It is even more convenient to employ from about 2 to about 10 parts by weight of the synergist for each part by weight of the antioxidant used.

It has been observed that the practice of this invention is facilitated greatly by the use, as the synergist, of an alkanolamine which is soluble in oils and fats. For this reason, in the case of the lower amino alcohols which, in and of themselves, are not soluble in fats and oils, it is convenient to use such alkanolamines in the form of their readily dispersible salts with higher fatty acids such as palmitic acid, stearic acid and oleic acid. The foregoing notwithstanding, however, it should be understood fully that even those lower amino alcohols, which are not soluble in fats and oils, exert an extraordinarily strong synergistic effect when used in the combination disclosed herein.

The stabilized vitamin compositions of this invention are readily prepared. In general, the procedure involves merely the mixing of the material to be stabilized with the antioxidant and the synergist, preferably in an inert atmosphere. Variations in the basic procedure will be obvious to persons skilled in the art and some of these variations will be demonstrated in the examples which follow hereinafter.

The stabilized vitamin compositions which are produced as described herein are eminently well suited for use as supplements for foods and feedstuffs. Such compositions are stable and they can be used as vitamin supplements either as is or in admixture with some diluent. In certain instances, for example, where it is desired to obtain a product of some specific potency or concentration or where it is desired to have the product in powder form, the addition of the present products to a diluent may be preferred. As the diluent there can be used, for example, a vegetable meal, such as oatmeal or soyameal; fats, waxes or wax-like compounds, such as hydrogenated castor oil, hydrogenated cottonseed oil, solid triglycerides or partial glycerides, such as glycerine monostearate; amides of higher fatty acids such as stearic acid amide; oils such as peanut oil, cottonseed oil, sesame oil; protein containing materials such as skimmed milk powder, caseine, calcium caseinate, glutin, zein, gelatin; carbohydrates such as lactose, starches, dextrin, gum arabic, methylcellulose; metal soaps, such as magnesium stearte, magnesium palmitate, calcium stearte, aluminum stearate; physioligically compatible mineral carrier materials, such as magnesium oxide, magnesium hydroxide, tricalcium phosphate; and mixtures of such materials. However, particularly well suited for use as diluents are vegetable oils, hydrogenated castor oil, oatmeal, glutin, calcium caseinate, gelatin, skimmed milk powder, magnesium stearate, magnesium oxide and mixtures thereof. It will be appreciated that the diluents can be incorporated into the presently disclosed products during the production thereof. In the alternative the stabilized vitamin compositions can be mixed with the desired diluent after their production.

The vitamin compositions of this invention are characterized particularly by their enhanced stability. They are very well suited for use in the fortification of various foods and feedstuffs with fat-soluble vitamins. When used as supplements for foods and feedstuffs, the vitamin component or components of the present products are stable even when such foods and feedstuffs are stored under unfavorable conditions.

For a fuller understanding of the nature and objects of this invention; reference may be had to the following examples which are given merely as illustrations of the invention and are not to be construed in a limiting sense.

Example 1

18 grams of arachis oil were heated to a temperature of 90° C., with the exclusion of air, and 16 grams of palmitic acid were dissolved therein. 5 grams of ethanolamine were finely distributed in this solution while stirring. Thereafter, 60 grams of vitamin A palmitate and 1 gram of γ-tocopherol were added and uniformly distributed therein by stirring. The resulting solution represented a vitamin A concentrate (1 million I.U. vitamin A per gram) suitable for use in the direct vitamin supplementation of edible fats and edible oils.

Example 2

74 grams of cottonseed oil stearate were melted at a temperature of 70° C. and, while stirring and with the exclusion of air, mixed with 3 grams of 6-ethoxy-2,2,4-trimethyl-1,2-dihydroquinoline and 3 grams of ethanolamine. Thereafter, 20 grams of vitamin A palmitate were homogenously stirred into the mixture, following which the melt was poured onto cold metal plates. The solidified mass was then ground with the addition of Dry Ice. A powdery product, suitable for the vitamin A enrichment of feed meals, was obtained.

Example 3

56 grams of cottonseed oil stearate were melted at a temperature of 70° C. and, while stirring and excluding air, mixed with 3 grams of 6-ethoxy-2,2,4-trimethyl-1,2-dihydroquinoline and 3 grams of propanolamine. Thereafter, 18 grams of oatmeal and 20 grams of vitamin A palmitate were homogenously stirred into the molten mixture following which the melt was poured onto cold metal plates. The solidified mass was ground with the addition of dry ice. There was thus obtained a powdery product suitable for the vitamin A enrichment of feed meals.

Example 4

60 grams of hydrogenated castor oil and 6 grams of palmitic acid were melted at a temperature of 95° C. and, while stirring and excluding air, mixed with 3 grams of 6-ethoxy-2,2,4-trimethyl-1,2-dihydroquinoline and 3 grams of propanolamine. Thereafter, 18 grams of glutin and 20 grams of vitamin A palmitate were added to, and homogenously stirred in, the mixture. The mass, heated at a temperature of 95° C. was dropped onto a plate of 11 cm. diameter, rotating at 3000 revolutions per minute, with the result that the mass was sprayed to form fine droplets. The spray-plate was situated 3 meters above the collecting surface. The fat droplets were solidified upon striking the collecting surface. The powder obtained in this way was found to be suitable for use in the enrichment of feeds. The major part of the particles produced by this method had a particle size between 0.15 and 0.45 mm.

Example 5

60 grams of hydrogenated castor oil and 5 grams of palmitic acid were melted at a temperature of 95° C. and, while stirring and excluding air, the melted mixture was mixed with 3 grams of 6-ethoxy-2,2,4-trimethyl-1,2-dihydroquinoline and 4 grams of ethanolamine. Thereafter, 8 grams of magnesium oxide and 20 grams of vitamin A palmitate were added to, and homogenously stirred in, the molten mixture, following which the mixture was poured onto cold metal plates. The mixture solidified and when solid it was ground with the addition of Dry Ice. The resulting powder was found to be suitable for use in the vitamin A enrichment of feed meals.

Example 6

80 grams of hydrogenated castor oil and 9 grams of palmitic acid were heated to a temperature of 135° C. in vacuo. 5 grams of β-apo-8′-carotinic acid ethyl ester, 3 grams of γ-tocopherol and 3 grams of propanolamine were added to, and dissolved in, the molten fat. The mixture, in molten state, was added to a cooled metal drum and the product was scraped off, in the form of fine flakes, after solidification. The product, thus obtained, was suitable for addition to feeds in this form. Furthermore, the flaked product, after grinding with the additional Dry Ice, was suitable for use as a feed supplement.

*Example 7*

62 grams of hydrogenated castor oil and 5 grams of palmitic acid were heated to a temperature of 95° C. and 25 grams of dl-α-tocopherol, 1 gram of γ-tocopherol, 1 gram of propanolamine and 5 grams of calcium caseinate were added thereto. The molten mixture was sprayed onto a rotating spray-plate, as described in Example 4. The resulting powder was found to be well suited for use in the enrichment of feeds with vitamin E.

*Example 8*

In order to demonstrate the enhanced stability of the present products as compared to those containing only an anti-oxidant, the following procedure was followed:

(a) 200 mg. of vitamin A palmitate were mixed with 4 mg. of γ-tocopherol.
(b) 200 mg. of vitamin A palmitate were mixed with 4 mg. of γ-tocopherol and 20 mg. of ethanolamine and 40 mg. of polyethylene glycol sorbitan monooleate.
(c) 200 mg. of vitamin A palmitate were mixed with 4 mg. of γ-tocopherol and 20 mg. propanolamine and 40 mg. of polyethylene glycol sorbitan monoleate.

Products (a), (b), (c) were stored in the air at a temperature of 45° C. on a glass plate of 9 cm.$^2$ area.

At time intervals of 12 hours, the vitamin A content was determined. The space of time in which the vitamin A content had decreased to 80% was considered as the induction period.

Products (b) and (c), which were stabilized with the synergist mixture of this invention had a much longer induction period than product (a) which was stabilized only with the antioxidant.

I claim:

1. A composition comprising (1) a fat-soluble vitamin material, (2) an antioxidant selected from the group consisting of 6-ethoxy-2,2,4-trimethyl-1,2-dihydroquinoline, butylated hydroxy toluene, butylated hydroxy anisole, 4,4'-bis-(2,6-ditertiary-butyl-phenol), γ-tocopherol, and an ester of gallic acid with an aliphatic monohydroxy alcohol having from 3 to 12 carbon atoms and (3), as a synergist, a member selected from the group consisting of a liquid primary lower alkanolamine, a solid primary lower alkanolamine and salts of such amino alcohols with a higher fatty acid, there being present in said composition, a quantity of component (2) which is from about 0.1% to about 50% of the weight of said component (1) and a quantity of component (3) which is at least about 0.1% of the weight of said component (1) and which is not more than ten times the weight of said component (2).

2. A composition of claim 1 which contains additionally a diluent.

3. A composition comprising (1) vitamin A, (2) an antioxidant selected from the group consisting of 6-ethoxy-2,2,4-trimethyl-1,2-dihydroquinoline, butylated hydroxy toluene, butylated hydroxy anisole, 4,4'-bis-(2,6-ditertiary-butyl-phenol), γ-tocopherol and an ester of gallic acid with an aliphatic monohydroxy alcohol having from 3 to 12 carbon atoms and (3) as a synergist, a member selected from the group consisting of a liquid primary lower alkanolamine, a solid primary lower alkanolamine and salt of such amino alcohols with a higher fatty acid, there being present in said composition, a quantity of component (2) which is from about 0.1% to about 50% of the weight of said component (1) and a quantity of component (3) which is at least about 0.1% of the weight of said component (1) and which is not more than ten times the weight of said component (2).

4. A composition comprising (1) β-apo-8'-carotinic acid ethyl ester, (2) an antioxidant selected from the group consisting of 6-ethoxy-2,2-4-trimethyl-1,2-dihydroquinoline, butylated hydroxy toluene, butylated hydroxy anisole, 4,4'-bis-(2,6-ditertiary-butyl-phenol), γ-tocopherol and an ester of gallic acid with an aliphatic monohydroxy alcohol having from 3 to 12 carbon atoms and (3), as a synergist, a member selected from the group consisting of a liquid primary lower alkanolamine, a solid primary lower alkanolamine and a salt of such amino alcohol with a higher fatty acid, there being present in said composition, a quantity of component (2) which is from about 0.1% to about 50% of the weight of said component (1) and a quantity of component (3) which is at least about 0.1% of the weight of said component (1) and which is not more than ten times the weight of said component (2).

5. A composition comprising (1) dl-α-tocopherol, (2) an antioxidant selected from the group consisting of 6-ethoxy-2,2,4-trimethyl-1,2-dihydroquinoline, butylated hydroxy toluene, butylated hydroxy anisole, 4,4'-bis(2,6-ditertiary-butyl-phenol), γ-tocopherol and an ester of gallic acid with an aliphatic monohydroxy alcohol having from 3 to 12 carbon atoms and (3), as a synergist, a member selected from the group consisting of a liquid primary lower alkanolamine, a solid primary lower alkanolamine and a salt of such amino alcohol with a higher fatty acid, there being present in said composition, a quantity of component (2) which is from about 0.1% to about 50% of the weight of said component (1) and a quantity of component (3) which is at least about 0.1% of the weight of said component (1) and which is not more than ten times the weight of said component (2).

6. A composition comprising (1) vitamin A palmitate, (2) γ-tocopherol and (3) ethanolamine, there being present in said composition, a quantity of γ-tocopherol which is from about 0.1% to about 50% by weight of said vitamin A palmitate and a quantity of ethanolamine which is at least about 0.1% of the weight of said vitamin A palmitate and which is not more than ten times the weight of said γ-tocopherol.

7. A composition comprising (1) vitamin A palmitate, (2) 6-ethoxy-2,2,4-trimethyl-1,2-dihydroquinoline and (3) ethanolamine, there being present in said composition, a quantity of 6-ethoxy-2,2,4-trimethyl-1,2-dihydroquinoline which is from about 0.1% to about 50% of the weight of said vitamin A palmitate and a quantity of ethanolamine which is at least about 0.1% of the weight of said vitamin A palmitate and which is not more than 10 times the weight of said 6-ethoxy-2,2,4-trimethyl-1,2-dihydroquinoline.

8. A composition comprising (1) vitamin A palmitate, (2) 6-ethoxy-2,2,4-trimethyl-1,2-dihydroquinoline and (3) propanolamine, there being present in said composition, a quantity of 6-ethoxy-2,2,4-trimethyl-1,2-dihydroquinoline which is from about 0.1% to about 50% of the weight of said vitamin A palmitate and a quantity of propanolamine which is at least about 0.1% of the weight of said vitamin A palmitate and which is not more than 10 times the weight of said 6-ethoxy-2,2,4-trimethyl-1,2-dihydroquinoline.

9. A composition comprising (1) β-apo-8'-carotinic acid ethyl ester, (2) γ-tocopherol and (3) propanolamine, there being present in said composition a quantity of γ-tocopherol which is from about 0.1% to about 50% of the weight of said β-apo-8'-carotinic acid ethyl ester and a quantity of propanolamine which is at least about 0.1% of the weight of said β-apo-8'-carotinic acid ethyl ester and which is not more than 10 times the weight of said γ-tocopherol.

10. A composition comprising (1) dl-α-tocopherol, (2) γ-tocopherol and (3) propanolamine, there being present in said composition, a quantity of γ-tocopherol which is from about 0.1% to about 50% of the weight of said dl-α-tocopherol and a quantity of propanolamine which is at least about 0.1% of the weight of said dl-α-tocopherol and which is not more than 10 times the weight of said γ-tocopherol.

11. A composition comprising (1) vitamin A palmitate (2) γ-tocopherol and (3) propanolamine, there being present in said composition, a quantity of γ-tocopherol which is from about 0.1% to about 50% of the weight of said vitamin A palmitate and a quantity of propanolamine which is at least about 0.1% of the weight of said vitamin A palmitate and which is not more than 10 times the weight of said γ-tocopherol.

References Cited by the Examiner

UNITED STATES PATENTS 2,686,751   8/1954   Embree et al.   167—81
2,803,583   8/1957   Petersen et al.   167—65

OTHER REFERENCES

Chemical Abstracts, vol. 42, entry 8841 i. 1948, citing Bunyatyan et al., Biokhimiya, 13, 109–14 (1948).

LEWIS GOTTS, *Primary Examiner.*

FRANK CACCIAPAGLIA, *Examiner.*

R. HUFF, *Assistant Examiner.*